US006365648B1

(12) United States Patent
Couperus et al.

(10) Patent No.: US 6,365,648 B1
(45) Date of Patent: Apr. 2, 2002

(54) PIGMENT CONCENTRATE

(75) Inventors: Anja Couperus, Hoevelaken; Tjerk Groenman, Dronten, both of (NL); Stéphane Carlier, Seneffe (BE)

(73) Assignee: Sigma Coatings, B.V. (NL)

( * ) Notice: Subject to any disclaimer, the term of this patent is extended or adjusted under 35 U.S.C. 154(b) by 0 days.

(21) Appl. No.: 09/491,347

(22) Filed: Jan. 26, 2000

(30) Foreign Application Priority Data

Jan. 29, 1999 (EP) .............................................. 99101910

(51) Int. Cl.[7] .................................................. C08K 3/04
(52) U.S. Cl. ........................................ 523/340; 524/495
(58) Field of Search ............................ 523/340; 524/495

(56) References Cited

U.S. PATENT DOCUMENTS 5,847,057 A    12/1998   Kaplan et al. .............. 525/437

FOREIGN PATENT DOCUMENTS

| DE | 4328092 | 2/1995 |
|----|---------|--------|
| EP | 0008373 | 3/1980 |
| EP | 0077023 | 4/1983 |
| WO | WO 95/31507 | 11/1995 |

*Primary Examiner*—Edward J. Cain
(74) *Attorney, Agent, or Firm*—Michael J. Caddell

(57) ABSTRACT

The application relates to a method for preparing a pigment concentrate which is suitable, in particular, for the preparation of a powder coating. The pigment concentrate is prepared by pigment particles being comminuted in the presence of an aqueous binder essentially consisting of a polyester having a glass transition temperature of at least 60° C. and an acid value of at least 60, to form a stable paste or suspension, the said paste or suspension formed being subjected to a drying treatment, and the pigment concentrate being collected. The binder used is preferably free of cosolvent, while expediently it is a resin having an acid value of at least 70° C. Preferably, no dispersant is used. By using a pigment concentrate formed according to the present method, a powder coating can be formed which no longer has a tinting strength reserve.

10 Claims, No Drawings

_US 6,365,648 B1_

PIGMENT CONCENTRATE

FIELD OF THE INVENTION

The invention relates to a method for preparing a pigment concentrate, more in particular to a pigment concentrate suitable for preparing a powder coating.

BACKGROUND OF THE INVENTION

It should be noted that powder coatings are coating types which are applied by fluidized-bed dip coating or electrostatic spraying. This is followed by baking, as a result of which the powder forms a homogeneous film.

The powder coating is formed by a paint manufacturer by one or more pigments being mixed with a coating system (consisting of a resin and, where required, a hardener) and generally one or more additives and/or fillers. The mixture obtained is then homogeneously fused (where applicable, at a temperature below the cross-linking temperature) in an extrusion device and is extruded. The extrudate is then cooled to room temperature as rapidly as possible and is finely ground to obtain a powder which can be used as a powder coating.

The drawback of such a powder coating, however is that the powder formed may still have a suitable tinting strength reserve, tinting strength reserve being understood as meaning an amount of pigment whose staining power is not utilized. This can e.g. lead to color differences between batches.

GB-A-1197053 discloses a process for preparing pigment compositions comprising mixing an aqueous mass of a pigment and an aqueous emulsion or solution of a carrier (polyolefin, polyvinyl chloride, polyethylene oxide derivative, rosin or rosin derivative) to form an unagglomerated mixture and spray drying said mixture.

U.S. Pat. No. 3,759,864 discloses a process for preparing pigmented solid particles of film-forming polymer by volatilizing the liquid continuous phase of a pigmented dispersion of film-forming polymer.

BE-A-842049 discloses a process for preparing pigment compositions by mixing an aqueous suspension of polymer containing 30–70 wt % of polymer with an aqueous suspension of a mineral pigment containing at least 30 wt % of pigment, and spray drying the mixture at 30–200° C.

WO-A-95/31507 discloses a method for preparing a pigment concentrate, which is characterized in that pigment particles are comminuted in the presence of an aqueous binder and preferably of a dispersant to form a stable paste or suspension, the paste or suspension formed is subjected to a drying treatment, and the pigment concentrate is collected. The binder is preferably a resin having a glass transition temperature of 25–55° C. A most preferred binder is a saturated polyester resin having an acid value of from 20 to 55.

The prior art however still shows the above-mentioned drawback.

There was thus a need for an improved method for preparing a pigment concentrate suitable for powder coatings, and particularly a need for an improved composition for use in said method.

DETAILED DESCRIPTION OF THE INVENTION

The method of the invention for preparing a pigment concentrate suitable for preparing a powder coating is characterized in that pigment particles are comminuted in the presence of an aqueous binder essentially consisting of a polyester having a glass transition temperature of at least 60° C. and an acid value of at least 60, to form a stable paste or suspension, the paste or suspension formed is subjected to a drying treatment, and the pigment concentrate is collected.

The drying treatment applied preferably consists of spray drying; other drying treatments such as those employing a drying drum or a belt dryer for example may however also be used.

It should be noted that a stable paste or suspension has been obtained once the comminuted pigment particles no longer settle in the paste or suspension within a specific rest period of the paste or suspension. Usually, a period of 5–30 min. is chosen for this purpose.

During drying, only the amount of water present in the aqueous binder used is evaporated. The present process is therefore particularly environment-friendly, while it is moreover economically advantageous, since no material has to be recovered.

In the method according to the invention, there is preferably, in addition to the binder, no dispersant present. It was previously thought (e.g. in WO-A-95/31507) that a dispersant would make it easier to obtain a stable suspension or paste. Normally, thus, the pigment concentrate will contain 35–65% of pigment, the remainder being (anhydrous) binder.

Expediently, a binder free of cosolvent is employed. In practice it was found, however, that a cosolvent content up to approximately 5% in the binder to be used gives fairly acceptable results. The best results are obtained, however, with a cosolvent content of 0–1%.

In the method according to the invention, the binder used is preferably a resin which has a glass transition temperature of at least 60° C., more preferably at least 65° C., and preferably at most 80° C., more preferably at most 70° C. Such a material is still found to be readily fusible in the extrusion device during the subsequent formation of the powder coating. It should be noted in this context that the temperature used in the extrusion device is usually from 110 to 130° C.

Binders for use in the pigment concentrates of the invention essentially consist of polyester resins. Preferably, a saturated polyester resin is used. A particularly suitable polyester resin has an acid value between 60 and 90, more preferably of at least 70.

As stated above, in the present invention, pigment particles are comminuted with the formation of a stable paste or suspension. It was found in practice that a paste or suspension is stable if a particle size of less than 15 μm, preferably less than 10 μm, is obtained; such a particle size is preferably produced with the use of a bead mill. Obviously, the pigment particles must always be smaller than the thickness of the coating film ultimately to be formed. Moreover, the particle size is important for the gloss of the coating film to be formed, in the sense that the gloss is partly determined by the particle size of the pigment particles and their dispersity.

The invention was found to be particularly suitable for organic pigments; this is because it is very difficult to disperse such pigments during the manufacture of a powder coating. It was found, however, that as a result of them being used to make a pigment concentrate, such problems can be completely overcome.

Organic pigments which can be used, for example, are carbon black, phthalocyanine green, phthalocyanine blue, organic red and organic yellow.

The invention also relates to a method for forming a powder to be used as a powder coating, by mixing a pigment with a thermoplastic or thermosetting plastic, where applicable a hardener, and additives, by blending, melting, extruding and finely grinding the mixture into a powder, which method is characterized in that the pigment used is a pigment concentrate prepared according to the method disclosed above.

The invention further relates to a method for coating a substrate with a powder coating by mixing pigment particles with a thermoplastic or thermosetting plastic, where applicable a hardener, and additives, melting and extruding the mixture formed, comminuting the extrudate formed into a powder, applying the powder obtained to a substrate in the form of a thin layer and melting said thin layer to form a coating, which is characterized in that the pigment particles used are pigment concentrate particles obtained according to the method disclosed above.

The invention is particularly applicable to powder coating compositions based on polyester or epoxy-polyester resins.

The invention is explained below in more detail with reference to the following embodiments.

EXAMPLES

Examples 1 and 2 a. Polyester Emulsion

A carboxylated polyester resin having an acid number of 75 (mg KOH/g) and a Tg (determined using DSC) of 60° C. was prepared using 53 parts by weight (pbw) of terephthalic acid, 28 pbw of neopentyl glycol, 10 pbw of trimellitic anhydride and 9 pbw of diethylene glycol.

The resin was emulsified to form an emulsion containing 16 wt % polyester in a mixture of water (79 wt %), dimethylethanolamine (3 wt %) butyl glycol (2 Wt %).

b. Pigment Concentration

A mixture was formed from 400 pbw of polyester emulsion, 1.4 pbw of anti-foaming agent and 64 pbw of pigment. In Examples 1 and 2, there was respectively used a green and a violet pigment. Each pigment was dispersed with the aid of a bead mill to a particle size of maximum 10 μm, the result of the operation being a pigment paste. Each paste was then sprayed dry, and the desired pigment concentrate particles were obtained, which essentially consisted of 50 wt % of pigment and 50 wt % of binder.

c. Powder Coatings

Polyester powder coating compositions were prepared with a polyester, commercially available as Nebores TN6400;
a hardener, commercially available as Primid XL552; titanium dioxide;
the pigment concentrate; and the usual additives.

The compositions are indicated respectively in Tables 1 and 2. Each was applied on a substrate and baked, to form a coating.

Comparative Examples R1 and R2 (reference)

Powder coating compositions were prepared directly (i.e. without using a pigment concentrate) using the same components as in examples 1 and 2 respectively, in amounts as close as possible (with the objective to reach the same ratio TiO2/pigment).

The compositions are indicated respectively in Tables 1 and 2. Each was applied on a substrate and baked, to form a coating.

Comparative Examples PAL and PA2 (prior art)

a. Pigment Concentrates

Pigment concentrates were prepared substantially as described in Examples I of WO-A-95/31507, with the following differences:

i) The pigments used were respectively the green and the violet pigments used in Examples 1 and 2; and
ii) The amount of pigment was increased to obtain a concentrate containing 55 and 60 wt % of pigment respectively for PA1 and PA2.

b. Powder Coatings

Powder coating compositions were prepared using the same components as used in Examples 1 and 2, in amounts as close as possible (with the objective to reach the same ratio TiO2/pigment).

The compositions are indicated respectively in Tables 1 and 2. Each was applied on a substrate and baked, to form a coating.

Color Strength

The color strength was evaluated for each coating with respect to that of Comparative examples RI and R2 respectively as reference standard (i.e. 100%) containing the same pigment; a higher value expresses a better tinting strength.

Clusters

Pigment clusters were evaluated visually using a microscope (x10) on a scale from 0 (no clusters) to 10 (many big clusters).

TABLE 1

(green pigment; composition percentages by weight)

| | Example 1 | PA1 | R1 |
|---|---|---|---|
| polyester | 61.964% | 62.267% | 65.000% |
| hardener | 3.051% | 3.065% | 3.200% |
| titanium dioxide | 26.025% | 26.152% | 25.396% |
| pigment concentrate | 5.338% | 4.876% | — |
| pigment | — | — | 2.604% |
| additives | 3.622% | 3.640% | 3.800% |
| pigment | 2.669% | 2.682% | 2.604% |
| ratio TiO2/pigment | 9.751 | 9.752 | 9.753 |
| color strength | 147.8% | 135.0% | 100% (reference) |
| clusters | 1–2 | 6–7 | 8–9 |

TABLE 2

(violet pigment; composition percentages by weight)

| | Example 2 | PA2 | R2 |
|---|---|---|---|
| polyester | 64.548% | 64.699% | 65.000% |
| hardener | 3.178% | 3.185% | 3.200% |
| titanium dioxide | 27.110% | 27.173% | 27.300% |
| pigment concentrate | 1.390% | 1.161% | — |
| pigment | — | — | 0.700% |
| additives | 3.774% | 3.782% | 3.800% |
| pigment | 0.695% | 0.697% | 0.700% |
| ratio TiO2/pigment | 39 | 39 | 39 |
| color strength | 112.6% | 104.8% | 100% (reference) |
| clusters | 1–2 | 6 | 6 |

Example 3

A powder coating composition as mentioned in Table 3 was prepared using the pigment concentrate of Example 1, applied on a substrate and baked.

TABLE 3

(green pigment; composition percentages by weight)

|  | Example 3 |
| --- | --- |
| epoxy resin | 34.52% |
| Polyester of Ex. 1 | 34.52% |
| titanium dioxide | 22.30% |
| pigment concentrate | 4.95% |
| additives | 3.71% |
| pigment | 2.475% |
| ratio TiO2/pigment | 9.0 |
| clusters | 5 |

This is an example of use of a pigment concentrate according to the invention in an epoxy-polyester powder coating composition.

What is claimed is:

1. Method for preparing a pigment concentrate suitable for preparing a powder coating, wherein pigment particles are comminuted in the presence of an aqueous binder essentially consisting of a polyester to form a stable paste or suspension, the paste or suspension formed is subjected to a drying treatment, and the pigment concentrate is collected, characterized in that the polyester has a glass transition temperature of at least 60° C. and an acid value of at least 60.

2. Method according to claim 1, characterized in that the binder is a saturated polyester.

3. Method according to claim 2, characterized in that the polyester has an acid value of at least 70.

4. Method according to claim 3, characterized in that a binder having a cosolvent content of 0–5% is used.

5. Method according to claim 4, characterized in that the pigment particles are comminuted, with the use of a bead mill, to a particle size of less than 15 μm.

6. Method according to claim 5, characterized in that the pigment used is an organic pigment, in particular selected from carbon black, phthalocyanine green, phthalocyanine blue, organic red and organic yellow.

7. Pigment concentrate obtained with the method according to claim 6.

8. Method for forming a powder to be used as a powder coating, by mixing a pigment with a thermoplastic or thermosetting plastic, where applicable a hardener, and one or more additives, by blending, melting, extruding and finely grinding the mixture into a powder, characterized in that the pigment used is a pigment concentrate according to claim 7.

9. Method for coating a substrate with a powder coating by mixing pigment particles with a thermoplastic or thermosetting plastic, where applicable a hardener, and one or more additives, melting and extruding the mixture formed, comminuting the extrudate formed into a powder, applying the powder obtained to a substrate in the form of a thin layer and melting said thin layer to form a thin film, characterized in that the pigment particles used are pigment concentrate particles obtained according to the method according to any one of claims 1 to 6.

10. Method according to claim 9, wherein the powder coating is based on polyester or epoxy-polyester resins.

* * * * *